United States Patent [19]

Nishii

[11] Patent Number: 5,535,266
[45] Date of Patent: Jul. 9, 1996

[54] DATA COMMUNICATION APPARATUS HAVING AN AUTO-CALLING FUNCTION

[75] Inventor: Teruyuki Nishii, Yokohama, Japan

[73] Assignee: Canon Kabushiki Kaisha, Tokyo, Japan

[21] Appl. No.: 13,055

[22] Filed: Feb. 3, 1993

[30] Foreign Application Priority Data

Feb. 5, 1992 [JP] Japan ................................. 4-054285

[51] Int. Cl.⁶ ........................................... H04M 11/06
[52] U.S. Cl. ........................ 379/100; 379/93; 358/434; 358/400
[58] Field of Search ................. 379/100, 96–98, 379/93, 80, 81; 358/400, 404, 405, 434, 436, 442

[56] References Cited

U.S. PATENT DOCUMENTS

| | | | |
|---|---|---|---|
| 4,598,171 | 7/1986 | Hanscom et al. | 379/80 |
| 4,729,033 | 3/1988 | Yoshida | 379/100 |
| 4,741,021 | 4/1988 | Kotani et al. | 379/100 |
| 4,771,335 | 9/1988 | Obara | 358/442 |
| 4,800,439 | 1/1989 | Yoshino | 358/257 |
| 4,868,865 | 9/1989 | Ogawa et al. | 379/100 |
| 4,932,048 | 6/1990 | Kenmochi et al. | 379/67 |
| 4,939,772 | 7/1990 | Goto | 379/100 |
| 5,022,071 | 6/1991 | Mozer et al. | 379/97 |

*Primary Examiner*—John K. Peng
*Assistant Examiner*—Daniel J. Wu
*Attorney, Agent, or Firm*—Fitzpatrick, Cella, Harper & Scinto

[57] ABSTRACT

A data communication apparatus having an auto-calling function for effecting data communication in response to the reception of a signal related to data communication in a predetermined period after the auto-calling comprises a detection unit for detecting a voice signal and a unit for extending the predetermined signal monitoring period in accordance with the detection of the detection unit.

8 Claims, 3 Drawing Sheets

DATA COMMUNICATION APPARATUS HAVING AN AUTO-CALLING FUNCTION

BACKGROUND OF THE INVENTION

1. Field of the Invention

The present invention relates to a data communication apparatus having an auto-calling function.

2. Related Background Art

A facsimile apparatus having an auto-dialing function has been known.

In the communication by the facsimile apparatus having an auto-dialing (hereinafter referred to as AD) function, an acknowledge signal from a destination station is monitored for only a time T1 (35–40 seconds) as defined by the CCITT Recommendation T.30. A timing to set the time T1 is usually after dialing or after detection of a polarity reversal of a line.

In a facsimile apparatus having an automatic responding and recording telephone set connected thereto, the apparatus does not immediately acknowledges a calling signal but waits until the automatic responding and recording telephone set starts to operate. After the automatic responding and recording telephone set has started the operation, the apparatus monitors a line to determine if a calling station is a person or a facsimile apparatus., and when it detects a calling signal (CNG) which indicates that the calling station is a facsimile apparatus, it stops the operation of the automatic responding and recording telephone set and sends out a protocol signal to carry out facsimile communication.

Such a facsimile apparatus is disclosed in U.S. Pat. Nos. 4,800,439 and 4,932,048 and U.S. patent application Ser. No. 403,842 refiled on Sep. 5, 1989.

In order for a called facsimile apparatus to detect a CNG signal while it sends out an acknowledgement message, it is necessary to insert a frequency band elimination filter in an acknowledgement message transmission unit but this causes a problem in view of a cost and a circuit board packaging space. Accordingly, many of such apparatus determine the detection of the CNG signal during a message recording period following to the transmission of the acknowledgement message.

However, the method of setting of the time T1 after the detection of the polarity reversal of the line will fall into disuse because there exist exchanges which do not reverse the polarity.

In the facsimile apparatus which detects the CNG signal after the automatic responding and recording telephone set has been started in response to a call and an acknowledgement signal has been sent out, a response to the CNG signal is delayed. Accordingly, where the time T1 is set to monitor the response, there is a risk that the time T1 has already been elapsed when the called station sends back the acknowledgement signal and the communication may not be established because the line has been opened.

SUMMARY OF THE INVENTION

It is an object of the present invention to improve a data communication apparatus to remove the above-mentioned problems.

It is another object of the present invention to provide a data communication apparatus which appropriately monitors acknowledgement for different response times determined by types and status of destination stations when data is transmitted in an automatic call mode to assure the establishment of data communication.

In order to achieve the above objects, in accordance with the present invention, when a data communication protocol signal and a voice signal from a destination station are monitored for a predetermined time after the automatic call in the data transmission in the auto-call mode, the predetermined time to monitor the signals is extended when the voice signal is detected.

Other objects of the present invention will be apparent from the following detailed description of the preferred embodiments and the accompanying drawings.

DETAILED DESCRIPTION OF THE PREFERRED EMBODIMENTS

One embodiment of the present invention is now explained in detail with reference to the drawings, in which a facsimile apparatus having an auto-dialing function is described as a data communication apparatus, although the present invention is not limited to the facsimile apparatus but it is also applicable to various data communication apparatus such as a telex or computer communication.

Figure 1:
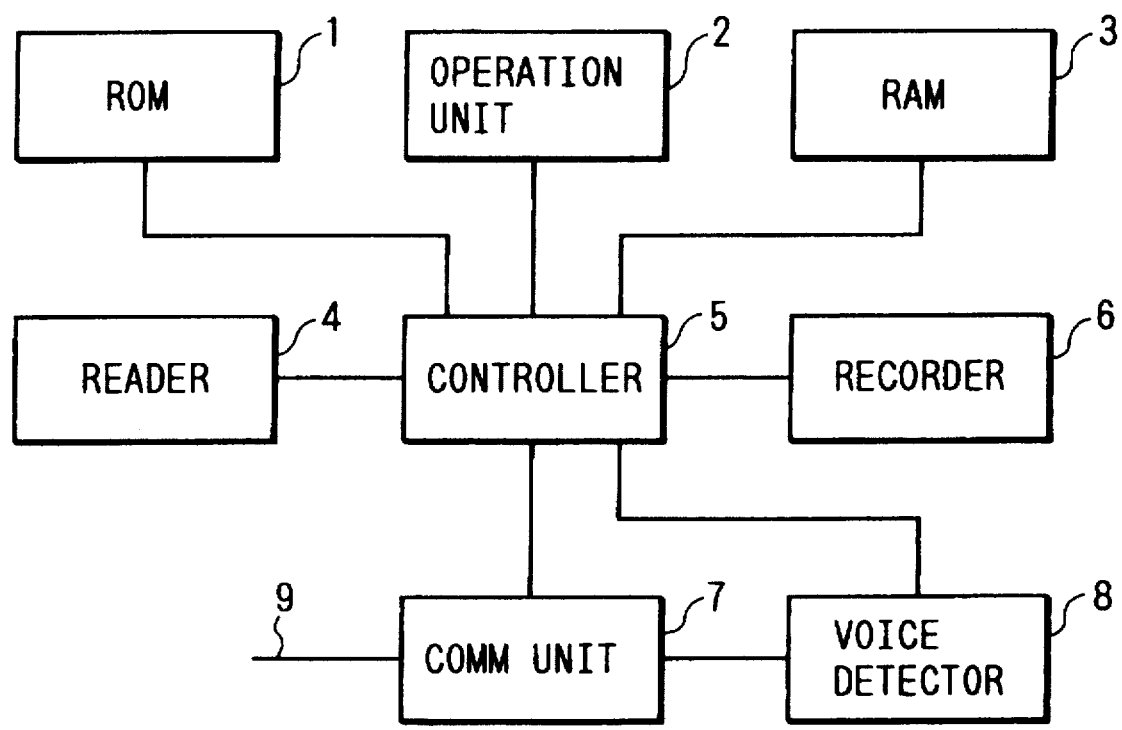
FIG. 1 shows a block diagram of a configuration of a facsimile apparatus in accordance with one embodiment of the present invention.

FIG. 1 shows a block diagram of a basic configuration of the facsimile apparatus in accordance with the embodiment.

In FIG. 1, a control unit 5 comprises a microprocessor device which controls an overall system in accordance with a program stored in a ROM 1.

A RAM 3 is used to store various constants entered by an operator through a console unit (or operation unit) 2. The control unit 5 reads out data from the RAM 3 as required.

A read unit 4 reads a document, and a record unit 6 prints out various reports such as an image signal and device constants.

A communication unit 7 comprises a network control unit (NCU), an auto-dialing circuit and a modem. It is connected with a communication line 9 and also with a voice detection unit 8 for detecting a voice signal on the communication line 9. The control unit detects the voice signal by an output from the voice detection unit 8.

Figure 2:
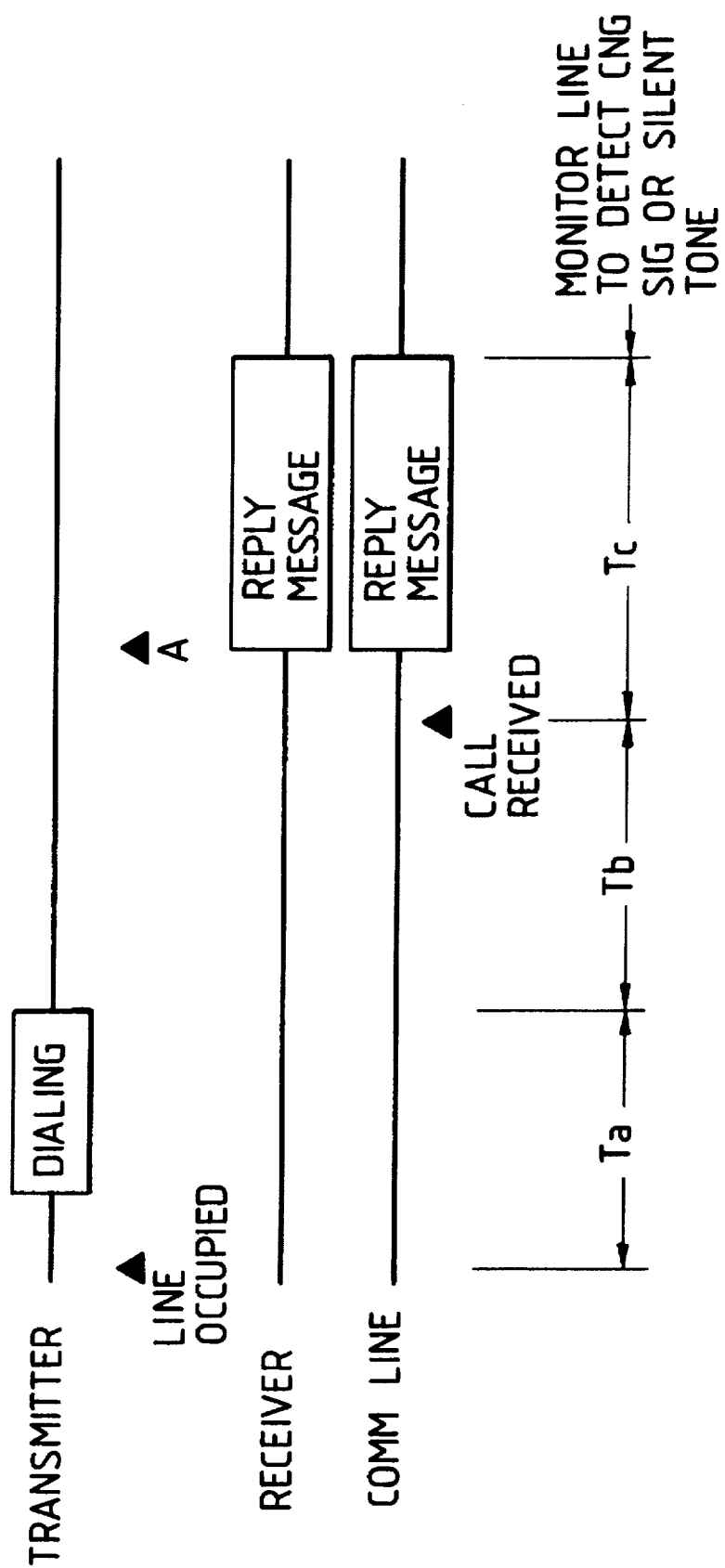
FIG. 2 shows a timing chart illustrating a progress of communication in the embodiment.

FIG. 2 shows a timing chart illustrating a status of a transmitter and a receiver and on a communication line when the receiving station is a facsimile apparatus having an automatic responding and recording telephone set connected thereto.

In FIG. 2, Ta denotes a time from the capture of the line by the transmitter to the completion of the dial output. The transmitter sets the time T1 after the elapse of the time Ta.

Tb denotes a time from the dialing by the transmitter to the response by the receiver which is called via an exchange. This time varies significantly depending on a communication distance, a path and a response process of the receiver to a calling signal.

Tc denotes a time from the receipt of the call by the receiver to the start of the automatic responding and recording telephone set and the completion of the acknowledgement message (or reply message). This time also varies significantly depending on the type of apparatus and the content of acknowledgement message.

After the receiver has sent out the acknowledgement message, it monitors a CNG signal and a continuous silent tone time to determine if the sending station is a person or a facsimile apparatus.

The sum of Tb and Tc is important. If it is sufficiently shorter than the time T1, there is no affect to the communication, but if it is longer than the time T1, there is an affect to the communication. Thus, the extension of the time T1 is controlled in the following manner.

Figure 3:
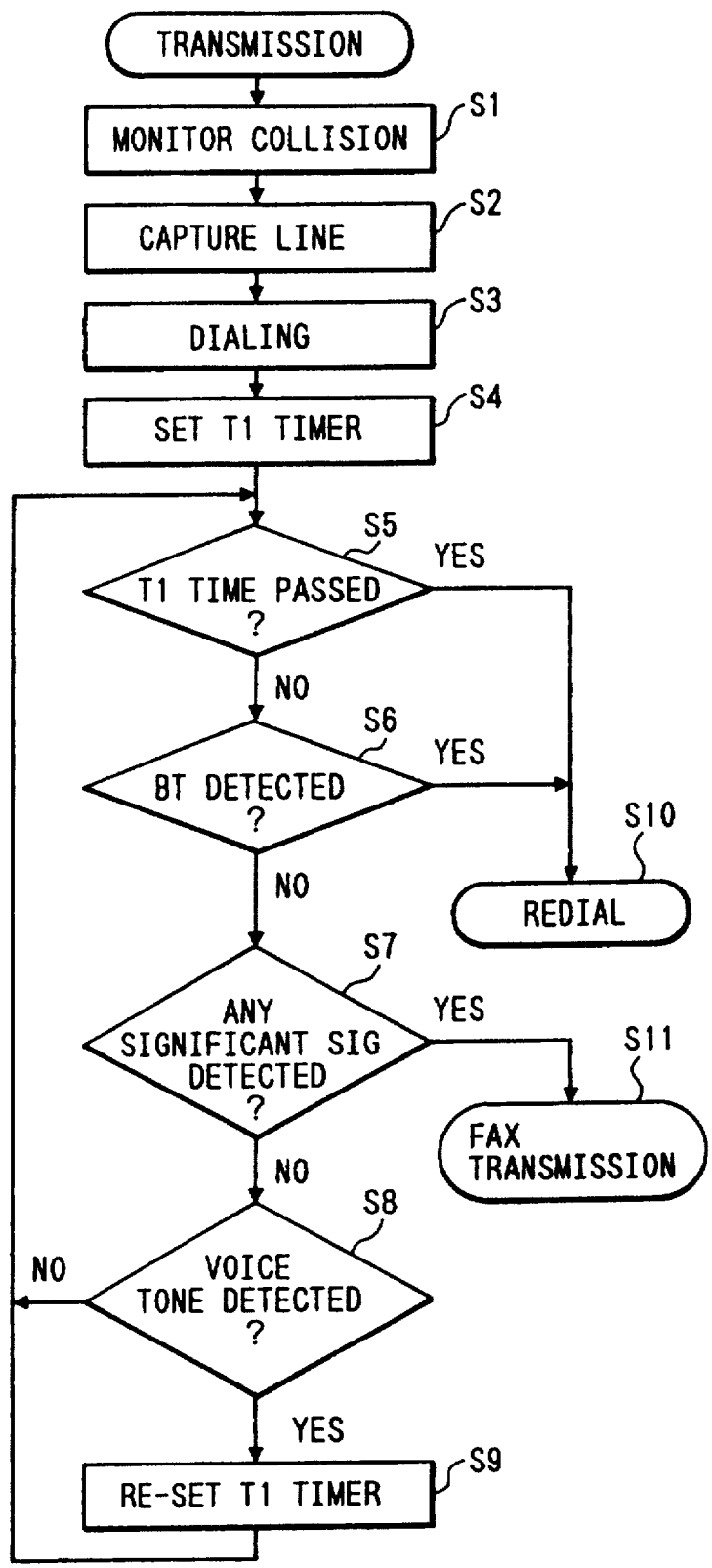
FIG. 3 shows a flow chart of a control operation of a control unit in the embodiment.

FIG. 3 shows a flow chart of an operation for the AD transmission in the present embodiment.

In a step S1, a collision is monitored. It is done in order to avoid the collison of the transmission and the reception to a calling signal. If a calling signal is detected in a line capture mode, the apparatus waits until the calling signal ceases or receives it and proceeds to a reception process.

In the step S1, if it is determined that no calling signal is detected, a line is captured (step S2). When the line is captured, a dialing signal is sent out (step S3) and the time T1 as defined by the CCITT Recommendation T.30 is set (step S4).

Then, the elapse of the time T1 is monitored (step T5). If no acknowledgement is detected during the time T1, redialing is made in a step S10 or an error process is carried out and the line is opened.

If the time T1 has not been elapsed yet, the acknowledgement input is monitored in steps S6–S8.

In the step S6, a busy tone signal (BT) is monitored. If a destination station is busy or if it is a person and he/she opens the line after the response, a line usage efficiency is improved by monitoring the BT signal. In the present embodiment, the time T1 is extended in response to the detection of a voice response as will be explained later. Accordingly, if the BT signal is detected during the extended period, the extension is immediately cancelled and the line is opened to terminate the communication. In this manner, effective communication is attained.

Since the BT signal may vary from exchange to exchange, on/off parameters of the BT signal can be registered on the RAM 3 through the console unit 2 so that they can be varied.

In the step S7, a significant signal is monitored, and if a facsimile protocol signal such as a called equipment identification (CED) or a digital identification signal (DIS) is detected, the process proceeds to a facsimile communication step S11.

In the step S8, a voice signal is monitored by the voice detection unit 8. If the voice detection unit 8 detects a voice signal on the communication line, it is determined that the destination station is a person or an acknowledgement message of an automatic responding and recording telephone set and the time T1 is extended (step S9). It is done at a timing A shown in FIG. 2. If the time T1 has already been elapsed at that moment, redialing is made or an error process is carried out to open the line as is done in the prior art system.

In this manner if the acknowledgement from the destination station is made in voice within the time T1, the time T1 is extended in order to secure the facsimile communication to the facsimile apparatus having the automatic responding and recording telephone set connected thereto.

In the present embodiment, the voice detection unit is provided to detect the voice signal. Alternatively, the voice signal may be detected by using a tonal detection function of a modem. In this case, there is no need to provide the audio detection unit and the cost and the circuit board packaging space are saved.

The present invention is not limited to the above embodiment but various modifications thereof may be made.

What is claimed is:

1. A data communication apparatus having an auto-calling function, for monitoring, by using timer, the reception of a procedure signal related to a data communication for a predetermined period after the auto-calling and effecting the data communication in response to the reception of said procedure signal, comprising:

detection means for detecting a voice signal; and means for extending said predetermined period for monitoring the procedure signal by re-setting the timer in accordance with the detection by said detection means.

2. A data communication apparatus according to claim 1 further comprising:

second detection means for detecting a busy signal indicating that a destination station is busy; and means for redialing in response to the detection by said second detection means.

3. A data communication apparatus according to claim 2 wherein the reception of said voice signal, said busy signal indicating the busy status and said procedure signal related to the data communication is monitored in said predetermined period.

4. A data communication method for effecting data communication in response to the reception of a procedure signal related to data communication during a predetermined period clocked by a timer after auto-dialing, comprising the steps of:

detecting a voice signal; and extending said predetermined period for monitoring said procedure signal by re-setting the timer in accordance with the detection of the voice signal.

5. A data communication method according to claim 4 further comprising the steps of:

detecting a busy signal indicating that a destination station is busy; and redialing in response to the detection of the busy signal.

6. A data communication method according to claim 5 wherein the reception of said voice signal, said busy signal and said procedure signal related to the data communication is effected in said predetermined period.

7. A data communication apparatus according to claim 1 wherein said procedure signal related to the data communication is a facsimile communication protocol signal.

8. A data communication method according to claim 4 wherein said procedure signal related to the data communication is a facsimile communication protocol signal.

* * * * *

UNITED STATES PATENT AND TRADEMARK OFFICE
CERTIFICATE OF CORRECTION

PATENT NO. : 5,535,266
DATED : July 9, 1996
INVENTOR(S) : TERUYUKI NISHII

It is certified that error appears in the above-indentified patent and that said Letters Patent is hereby corrected as shown below:

COLUMN 1

Line 21, "acknowledges" should read --acknowledge--.

COLUMN 3

Line 12, "affect" should read --effect--;
Line 13, "affect" should read --effect--.

COLUMN 4

Line 16, "timer," should read --a timer,--.

Signed and Sealed this

Tenth Day of December, 1996

Attest:

BRUCE LEHMAN

Attesting Officer

Commissioner of Patents and Trademarks